(12) United States Patent
Billore et al.

(10) Patent No.: US 10,230,582 B2
(45) Date of Patent: Mar. 12, 2019

(54) IDENTIFYING RESOURCES FOR PURGING IN A CLOUD BASED ON INTER-DEPENDENCY GRAPH ANALYSIS

(71) Applicant: INTERNATIONAL BUSINESS MACHINES CORPORATION, Armonk, NY (US)

(72) Inventors: Ashish Billore, Karnataka (IN); Sudheesh S. Kairali, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 15/250,352

(22) Filed: Aug. 29, 2016

(65) Prior Publication Data
US 2018/0062953 A1    Mar. 1, 2018

(51) Int. Cl.
*G06F 15/173* (2006.01)
*H04L 12/24* (2006.01)

(52) U.S. Cl.
CPC .......... *H04L 41/14* (2013.01); *H04L 41/0893* (2013.01); *H04L 41/0896* (2013.01); *H04L 41/5019* (2013.01); *H04L 41/5096* (2013.01)

(58) Field of Classification Search
CPC ....... H04L 43/045; H04L 41/12; H04L 41/14; H04L 67/10
USPC ......................................................... 709/223
See application file for complete search history.

(56) References Cited

U.S. PATENT DOCUMENTS

| | | | |
|---|---|---|---|
| 8,738,961 B2* | 5/2014 | Jain | G06F 11/2028 714/4.11 |
| 2015/0199226 A1* | 7/2015 | Wu | G06F 11/079 714/37 |
| 2015/0381711 A1 | 12/2015 | Singh et al. | |
| 2016/0182320 A1* | 6/2016 | Bartfai-Walcott | H04L 43/045 709/224 |
| 2016/0191343 A1* | 6/2016 | Dong | G06F 9/5083 709/226 |

OTHER PUBLICATIONS

Cohen et al., "Graph-based Cloud Resource Cleanup", The Interdisciplinary Center, http://www.deepness-lab.org, Last accessed Aug. 27, 2016, 2 pages.

(Continued)

*Primary Examiner* — Wing F Chan
*Assistant Examiner* — Joseph R Maniwang
(74) *Attorney, Agent, or Firm* — Tutunjian & Bitetto, P.C.; Scott Dobson

(57) ABSTRACT

A method and system are provided. The method includes constructing a dependency graph of cloud resources based on interdependencies between the cloud resources. The dependency graph includes a set of nodes, a set of edges, and a precedence order. Each node corresponds to one of the cloud resources. Each edge corresponds to an association between two of the cloud resources. The precedence order corresponds to a processing order of the nodes. The method further includes applying a set of cleanup rules to each node to determine a cleanup eligibility of any of the cloud resources corresponding to each node. The method also includes removing from the cloud any of the cloud resources determined to be cleanup eligible based on the applying step. The dependency graph is constructed by scanning, in a cloud resource dependency construct, different cloud resource types to be incorporated into the dependency graph.

19 Claims, 7 Drawing Sheets

500

501    502    503

| Source | Target | Dependency |
|---|---|---|
| VM1 | network | in network |
| VM2 | network | in network |
| VM3 | network | in network |
| VM1 | storage | uses storage |
| VM2 | storage | uses storage |

(56) References Cited

OTHER PUBLICATIONS

Bennett et al., "Janitor Monkey—Janitor Home", GitHub, https://github.com/Netflix/SimianArmy/wiki/Janitor-Home, Last Accessed Aug. 27, 2016, 2 pages.

* cited by examiner

| Source | Target | Dependency |
|--------|---------|-------------|
| VM1 | network | in network |
| VM2 | network | in network |
| VM3 | network | in network |
| VM1 | storage | uses storage |
| VM2 | storage | uses storage |

FIG. 5

IDENTIFYING RESOURCES FOR PURGING IN A CLOUD BASED ON INTER-DEPENDENCY GRAPH ANALYSIS

BACKGROUND

Technical Field

The present invention relates generally to information processing and, in particular, to identifying resources for purging in a cloud based on inter-dependency graph analysis.

Description of the Related Art

Current cloud solutions do not have rules which can cover the cleanup of resources based on a dependency tree/graph. There are no existing solutions which can cleanup cloud resources based on its association/dissociation with some other resources. As an example of a cloud resource cleanup, an administrator may want to remove all Virtual Machines (VMs) which are attached to a particular network in a configured interval. As another example of a cloud resource cleanup, an administrator may want to remove all storage which is not used after a period of two weeks.

SUMMARY

According to an aspect of the present principles, a method is provided. The method includes constructing a dependency graph of cloud resources based on interdependencies between the cloud resources. The dependency graph includes a set of nodes, a set of edges, and a precedence order. Each of the nodes corresponds to one of the cloud resources. Each of the edges corresponds to an association between two of the cloud resources. The precedence order corresponds to a processing order of the nodes. The method further includes applying a set of cleanup rules to each of the nodes to determine a cleanup eligibility of any of the cloud resources corresponding to the each of the nodes. The method also includes removing from the cloud any of the cloud resources determined to be cleanup eligible based on the applying step. The dependency graph is constructed by scanning, in a cloud resource dependency construct, different cloud resource types to be incorporated into the dependency graph.

According to another aspect of the present principles, a computer program product is provided for cloud resource management. The computer program product includes a computer readable storage medium having program instructions embodied therewith. The program instructions are executable by a computer to cause the computer to perform a method. The method includes constructing a dependency graph of cloud resources based on interdependencies between the cloud resources. The dependency graph includes a set of nodes, a set of edges, and a precedence order. Each of the nodes corresponds to one of the cloud resources. Each of the edges corresponds to an association between two of the cloud resources. The precedence order corresponds to a processing order of the nodes. The method further includes applying a set of cleanup rules to each of the nodes to determine a cleanup eligibility of any of the cloud resources corresponding to the each of the nodes. The method also includes removing from the cloud any of the cloud resources determined to be cleanup eligible based on the applying step. The dependency graph is constructed by scanning, in a cloud resource dependency construct, different cloud resource types to be incorporated into the dependency graph.

According to yet another aspect of the present principles, a system is provided. The system includes a computing device, having a processor and a memory. The computing device is configured to construct a dependency graph of cloud resources based on interdependencies between the cloud resources. The dependency graph includes a set of nodes, a set of edges, and a precedence order. Each of the nodes corresponds to one of the cloud resources. Each of the edges corresponds to an association between two of the cloud resources. The precedence order corresponds to a processing order of the nodes. The computing device is further configured to apply a set of cleanup rules to each of the nodes to determine a cleanup eligibility of any of the cloud resources corresponding to the each of the nodes. The computing device is also configured to remove from the cloud any of the cloud resources determined to be cleanup eligible based on an application of the cleanup rules to the nodes. The dependency graph is constructed by scanning, in a cloud resource dependency construct, different cloud resource types to be incorporated into the dependency graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 shows an exemplary dependency table based on the cloud configuration depicted in the dependency graph of FIG. 3, in accordance with an embodiment of the present principles;

DETAILED DESCRIPTION

The present principles are directed to identifying resources for purging in a cloud based on inter-dependency graph analysis.

In an embodiment, the present principles use a dependency graph of cloud resources to optimize cloud resource cleanup.

In an embodiment, the present principles provide an approach to identify cloud resources and their dependencies so as to classify and determine the resources which can and cannot be safely purged, starting from a node or a resource in a cloud.

In an embodiment, the present principles provide a solution which allows a cloud design to tailor/configure cleanup based on the dependency of resources with respect to each other. In an embodiment, the present principles construct a dependency graph of each cloud, apply cleanup rules to all of the nodes of the graph, and identify any of the nodes which are qualified for cleanup.

Figure 1:
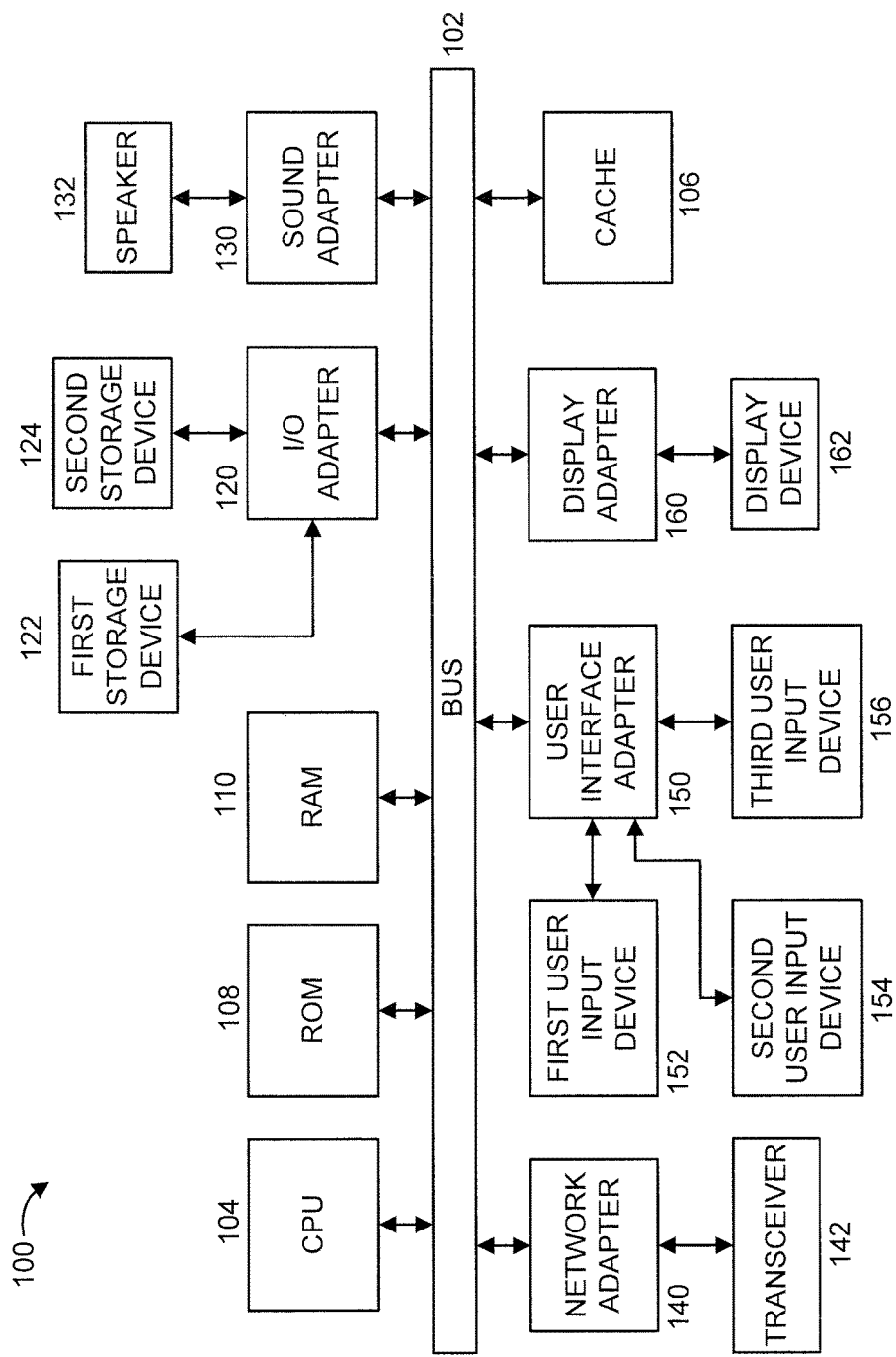
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
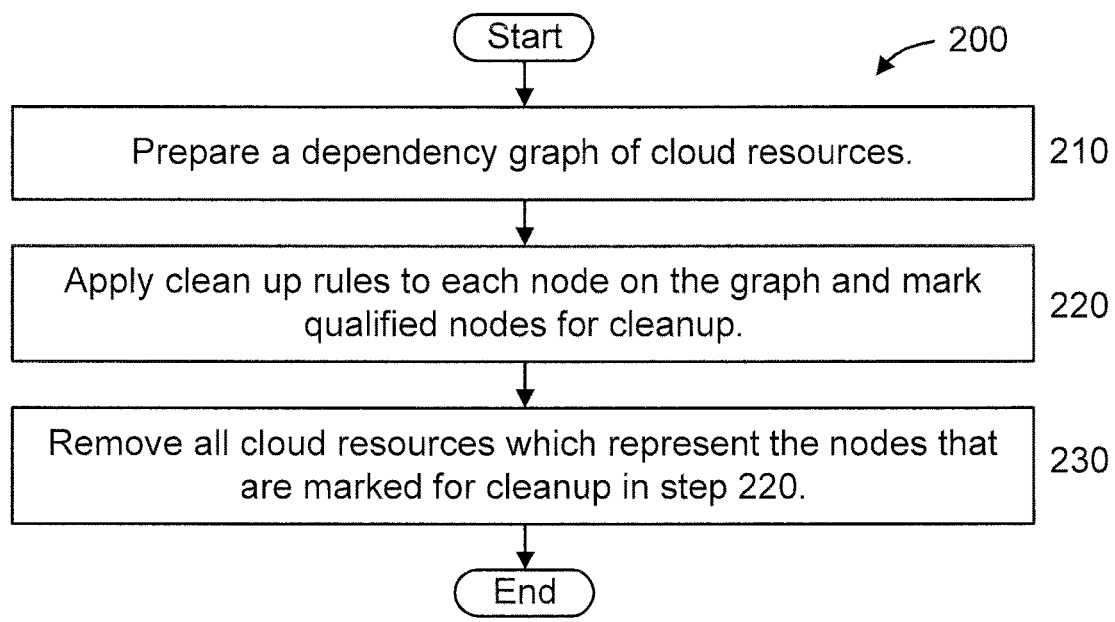
FIG. 2 shows an exemplary method for identifying resources for purging in a cloud based on inter-dependency graph analysis, in accordance with an embodiment of the present principles.

FIG. 2 shows an exemplary method 200 for identifying resources for purging in a cloud based on inter-dependency graph analysis, in accordance with an embodiment of the present principles.

At step 210, prepare a dependency graph of cloud resources.

At step 220, apply clean up rules to each node on the graph and mark qualified nodes for cleanup.

At step 230, remove all cloud resources which represent the nodes that are marked for cleanup in step 220.

A description will now be given regarding a dependency graph of cloud resources, in accordance with an embodiment of the present principles. The description can relate to the dependency graph of cloud resources prepared per step 210 in FIG. 2.

A dependency graph of cloud resources can be defined as a Graph G consisting of the following:
(a) a set of V nodes (each node is a cloud resources such as VM/network/Storage, and so forth);
(b) a set of E edges (each edge is an association between two resources in cloud); and
(c) a linear precedence order < on V (or when the graph is built, the order in which each node is considered).

Figure 3:
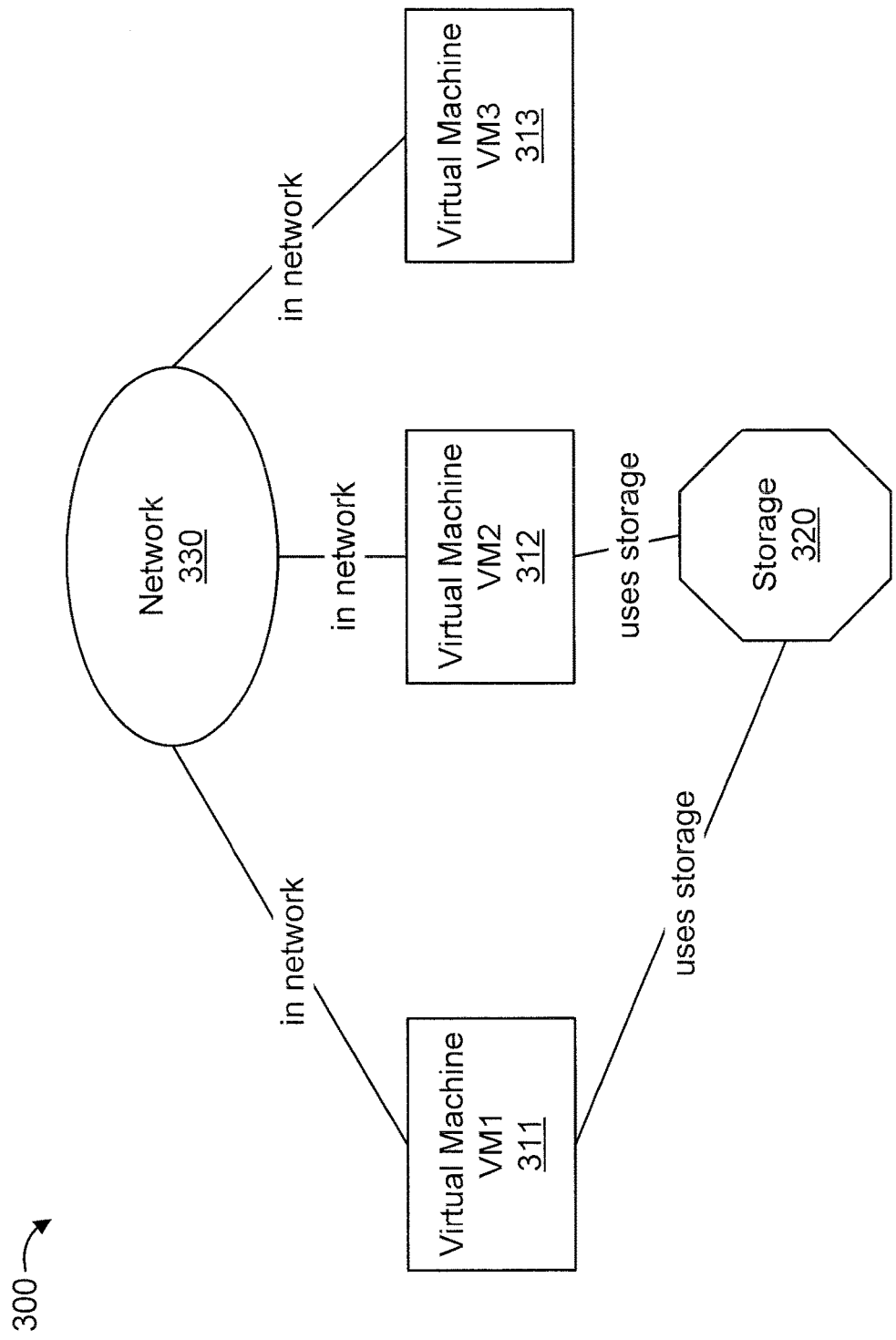
FIG. 3 shows an exemplary dependency graph, in accordance with an embodiment of the present principles.

FIG. 3 shows an exemplary dependency graph 300, in accordance with an embodiment of the present principles. The dependency graph 300 includes Virtual Machines (VMs) (namely VM1 311, VM2 312, and VM3 313), a storage device 320, and a network 330.

The following description applies to the nodes of dependency graph 300:
(a) network 330→a network used for the cloud;
(b) VM1 311, VM2 312, and VM3 313 are the VMs in the cloud, where VM1 311 and VM2 312, but not VM3 313, use storage device 320 as external storage. All of the VMs (VM1 311, VM2 312, and VM3 313) reside on the network 330; and
(c) storage 320→external storage used by VMs in the cloud.

The following description applies to the edges of dependency graph 300. There are two types of edges in dependency graph 300, namely "(a) in network" and (b) "uses storage". Regarding "in network", this type of edge shows the dependency between a network node and any VM. Regarding "uses storage", this type of edge shows dependency between the storage 320 and the VMs (VM1 311 and VM2 312).

The following description applies to the precedence of the dependency graph 300.

The precedence of each dependency graph depends upon how the cloud needs to be cleaned up. For example, if the network 330 is to stay/remain alive even after all VMs (VM1 311, VM2 312, and VM3 313) are cleaned up, and if storage 330 needs to be cleaned up if all VMs (namely VM1 311 and VM2 312) using that storage 330 are cleaned up then below precedence can be assumed as follows:
(a) network 330 with highest precedence;
(b) storage 320 with second precedence; and
(c) all VMs 311, 312, and 313 with lowest precedence.

A description will now be given regarding preparing dependency graphs of cloud resources.

Figure 4:
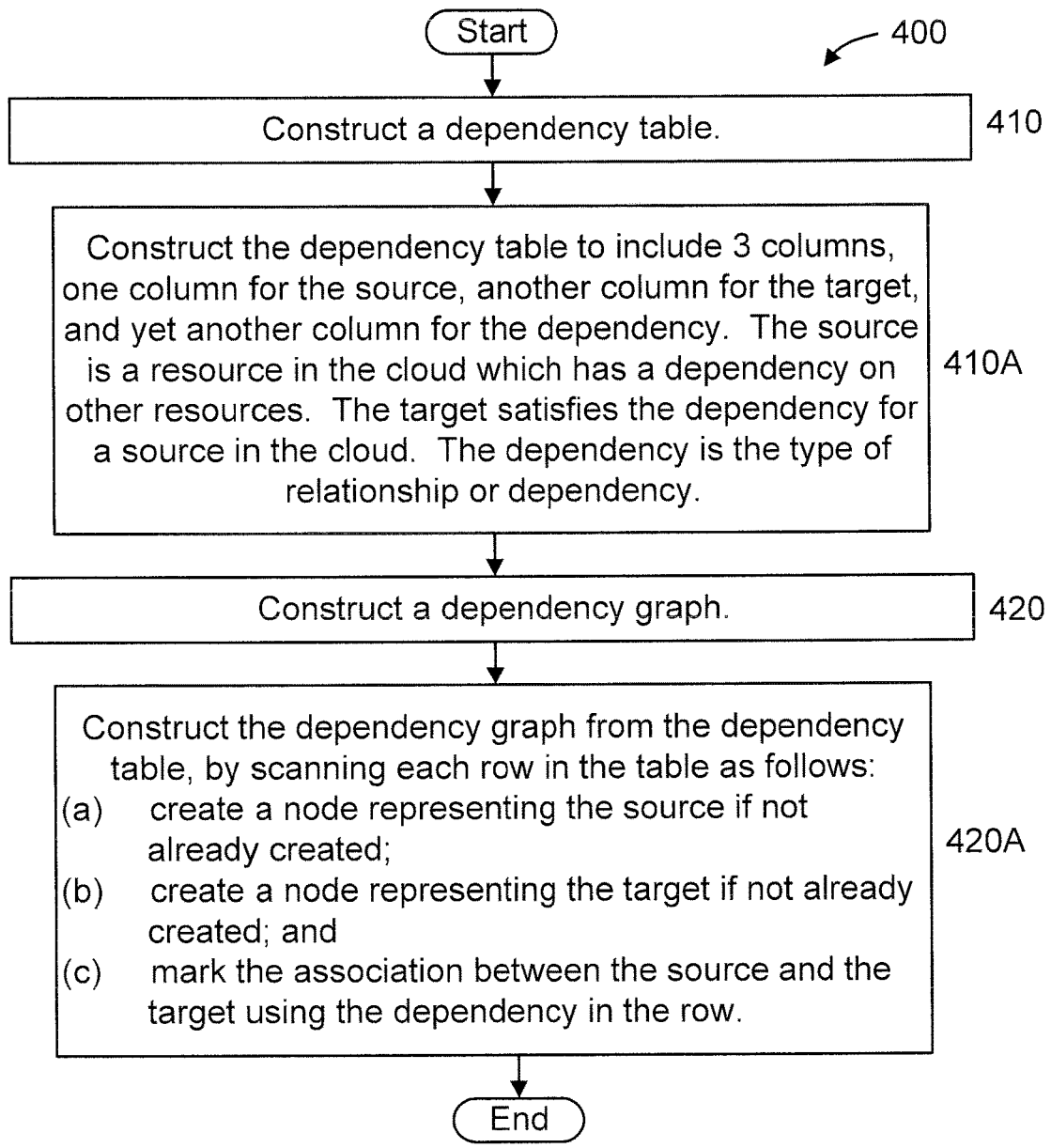
FIG. 4 shows an exemplary method for preparing a dependency graph of cloud resources, in accordance with an embodiment of the present principles.

FIG. 4 shows an exemplary method 400 for preparing a dependency graph of cloud resources, in accordance with an embodiment of the present principles.

In an embodiment, there can be considered two primary steps in preparing a dependency graph of cloud resources.

At step 410, construct a dependency table.

In an embodiment, step 410 can include step 410A.

At step 410A, construct the dependency table to include 3 columns, one column for the source, another column for the target, and yet another column for the dependency. The source is a resource in the cloud which has a dependency on other resources. The target satisfies the dependency for a source in the cloud. The dependency is the type of relationship or dependency.

The dependency table can be constructed while the cloud is provisioned or later by scanning the type of resources which need to be analyzed using dependency graphs. Generally, such types of resources include, but are not limited to, networks, storage, and VMs.

At step 420, construct a dependency graph.

In an embodiment step 420 includes step 420A.

At step 420A, construct the dependency graph from the dependency table, by scanning each row in the table as follows:
  (a) create a node representing the source if not already created;
  (b) create a node representing the target if not already created; and
  (c) mark the association between the source and the target using the dependency in the row.

It is to be noted that the source in one row of the dependency table can be the target in another row of the dependency table. In the dependency graph, these two (that is, the source in the one row and the target in the other row) will represent the same node.

FIG. 5 shows an exemplary dependency table 500 based on the cloud configuration depicted in the dependency graph 300 of FIG. 3, in accordance with an embodiment of the present principles.

The dependency table includes a first column 501 denoting the source, a second column 502 denoting the target, and a third column 503 denoting the dependency.

A description will now be given regarding cleanup rules based on dependency graphs, in accordance with an embodiment of the present principles.

In an embodiment, cleanup rules are executed on each node of the dependency graph. While some exemplary rules are described herein for the sake of illustration, it is to be appreciated that the present principles are not limited to the same and can thus also be employed using other cleanup rules as readily contemplated by one of ordinary skill in the art given the teachings of the present principles provided herein, while maintaining the spirit of the present principles.

Rule 1: Cleanup of resources based on association. Based on Rule 1, all the nodes that are associated with (1) a particular node can be marked for cleanup.

Regarding Rule 1, the following values are to be kept configurable in this rule:
  (a) the particular node (marked as (1) in the definition of Rule 1) that is to be scanned for all associated nodes; and
  (b) the level of association→not all associations are direct. Some of the associations are multiple levels.

As an example, consider the following associations: node1→depends→node2→depends→node3. In the preceding example, the association between node1→node2 is at a 1st level and the association between node1→node3 is at a $2^{nd}$ level.

Rule 1 should be able to handle nth level associations keeping "n" as configurable.

Rule 1 can also allow "−1" as a level, which can indicate that all possible levels of associations with the target node should be cleaned up.

A description will now be given of an example use case for Rule 1, in accordance with an embodiment of the present principles.

In the example use case for Rule 1, the administrator wants to remove all cloud resources that are associated with a particular network.

Thus, to achieve the preceding, configure Rule 1 with the target node as the network and the level of association as "−1", and Rule 1 will mark all resources that are directly or indirectly using the above network as qualified for cleanup.

Rule 2: Cleanup of resources based on dissociation. Based on Rule 2, all the nodes that are not associated with any other nodes are marked for cleanup.

A description will now be given of an example use case for Rule 2, in accordance with an embodiment of the present principles.

In the example use case for Rule 2, the administrator wants to remove all storages that are no longer used.

Thus, to achieve the preceding, configure Rule 2 to mark all (storage) resources that are no longer used.

Rule 3: Cleanup of resources based on dissociation with a specific node. Based on Rule 3, all nodes that are not associated with a (1) particular node can be marked for cleanup.

Regarding Rule 3, the following values are to be kept configurable in this rule:
  (a) the particular node (marked as (1) in the definition of Rule 3) that is to be scanned for all associated nodes.

A description will now be given of an example use case for Rule 3, in accordance with an embodiment of the present principles.

In the example use case for Rule 3, the administrator wants to remove all VMs from a cloud which are not using a designated storage.

Thus, to achieve the preceding, configure Rule 3 to mark all resources that are not using the designated storage.

Rule 4: Cleanup of resources based on a time limited association with a specific node. Based on Rule 4, all the nodes that are associated with a (1) particular node more than a (2) particular time limit can be marked for cleanup.

In an embodiment, the time limit can be implemented by storing the association start time. Moreover, in an embodiment, an implementation of Rule 4 can involve storing and analyzing multiple dependency graphs.

Regarding Rule 4, the following values are to be kept configurable in this rule:
  (a) the particular node (marked as (1) in the definition of Rule 4) that is to be scanned for all associated nodes; and
  (b) the particular time limit (marked as (2) in the definition of Rule 4).

A description will now be given of an example use case for Rule 4, in accordance with an embodiment of the present principles.

In the example use case for Rule 4, the administrator wants to remove all VMs from a cloud which are using standby storage for more than 2 weeks.

Thus, to achieve the preceding, configure Rule 4 to mark all resources that are standby storage for more than 2 weeks.

Rule 5: Cleanup of resources based on time limited dissociation. Based on Rule 5, all nodes that are not associated with any other nodes more than (2) a particular time limit are to be marked for cleanup.

In an embodiment, the time limit can be implemented by storing the association start time. Moreover, in an embodiment, an implementation of Rule 4 can involve storing and analyzing multiple dependency graphs.

Regarding Rule 5, the following values are to be kept configurable in this rule:

(a) the particular time limit (marked as (2) in the definition of Rule 5)

A description will now be given of an example use case for Rule 5, in accordance with an embodiment of the present principles.

In the example use case for Rule 5, the administrator wants to remove all storages that are no longer used.

Thus, to achieve the preceding, configure Rule 5 to mark all resources that are no longer used.

Rule 6: Cleanup of resources based on time limited dissociation with a specific node. Based on Rule 6, all the nodes that are not associated with (1) a particular node more than (2) a particular time limit can be marked for cleanup.

Regarding Rule 6, the following values are to be kept configurable in this rule:

(a) the particular node (marked as (1) in the definition of Rule 6) that is to be scanned for all associated nodes; and
(b) the particular time limit (marked as (2) in the definition of Rule 6).

A description will now be given of an example use case for Rule 6, in accordance with an embodiment of the present principles.

In the example use case for Rule 6, the administrator wants to remove all VMs from a cloud which are not using a designated storage.

Thus, to achieve the preceding, configure Rule 6 to mark all resources which are not using a designated storage (any more).

A description will now be given regarding other rules that can be used in accordance with the present principles.

It is to be appreciated that other custom rules than those described herein can be devised and used by the present principles. Such rules can be based on, for example, the type and industry of the particular cloud to which the present principles are to be applied. Such rules can be, for example, but are not limited to, a mix of association and dissociation rules.

From an implementation perspective, how the rules (logic) is connected to cloud management code depends upon the implementation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
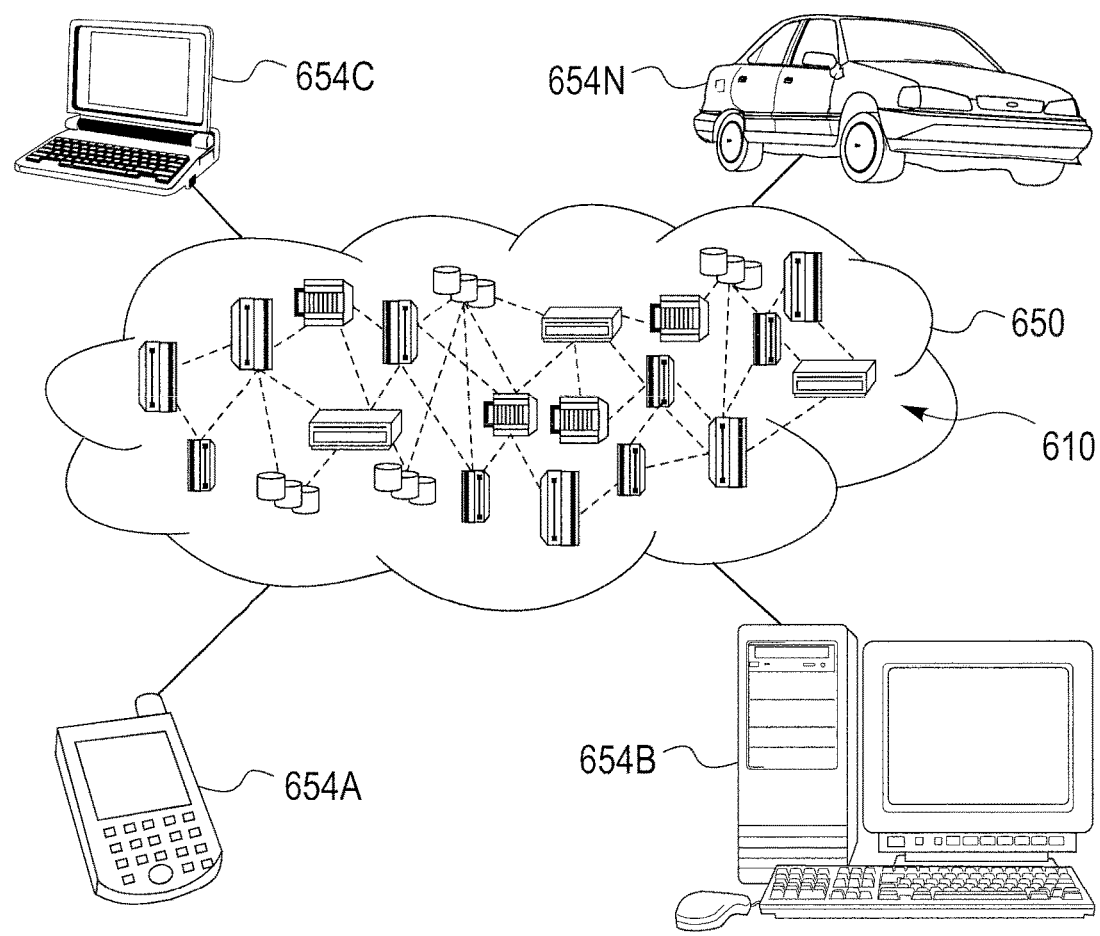
FIG. 6 shows an exemplary cloud computing environment, in accordance with an embodiment of the present principles.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
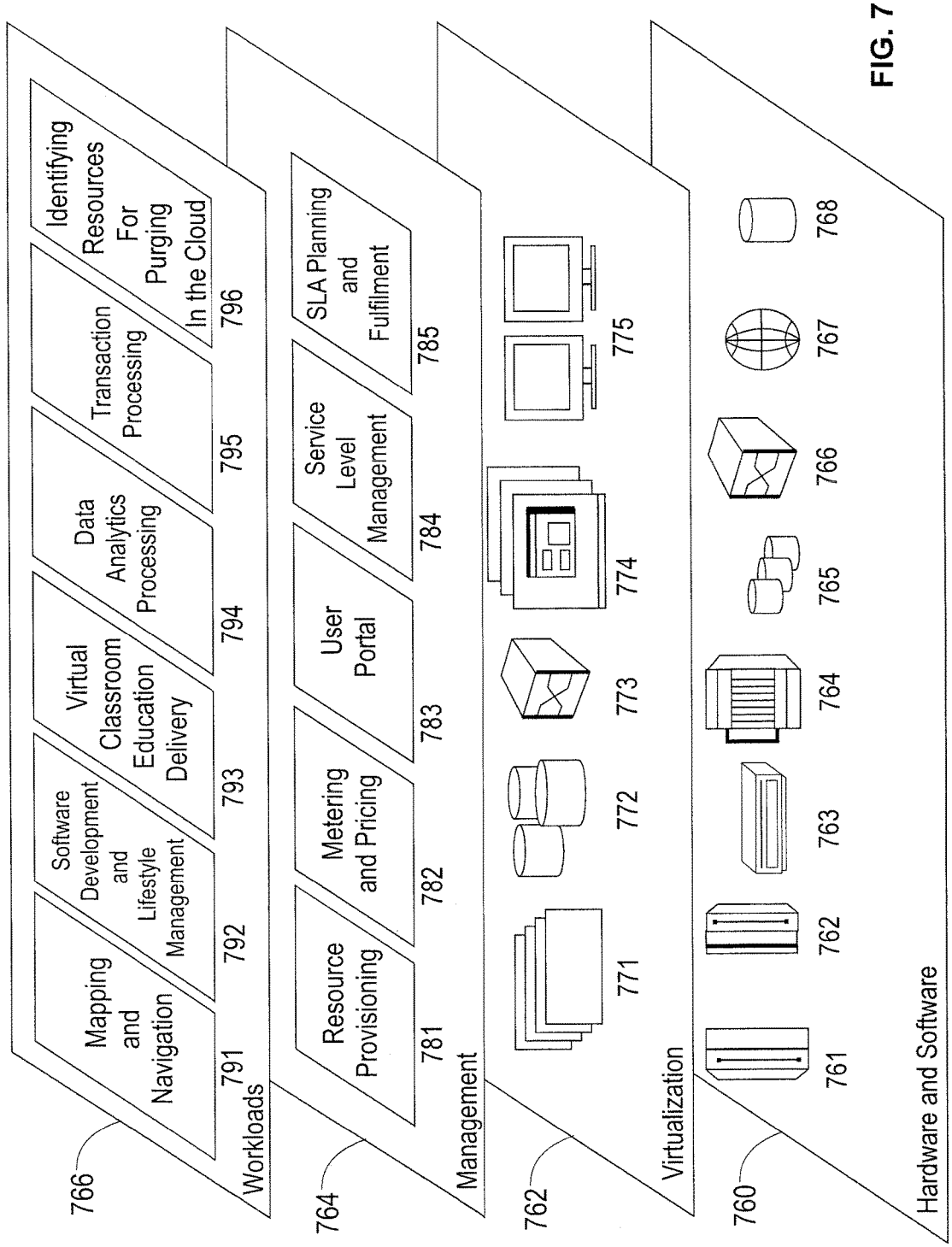
FIG. 7 shows an exemplary set of functional abstraction layers provided by the cloud computing environment shown in FIG. 6, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and identifying resources for purging in a cloud based on inter-dependency graph analysis 796.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
constructing a dependency graph of cloud resources based on interdependencies between the cloud resources, the dependency graph including a set of nodes, a set of edges, and a precedence order, each of the nodes corresponding to one of the cloud resources, each of the edges corresponding to an association between two of the cloud resources, and the precedence order corresponding to a processing order of the nodes;
applying a set of cleanup rules to each of the nodes to determine a cleanup eligibility of any of the cloud resources corresponding to the each of the nodes; and
removing from the cloud any of the cloud resources determined to be cleanup eligible based on said applying step,
wherein the dependency graph is constructed by scanning, in a cloud resource dependency construct, different cloud resource types to be incorporated into the dependency graph, and
wherein at least one of the cleanup rules is based on node dissociation, such that the cloud resources, corresponding to any of the nodes that are dissociated with any other ones of the nodes, are removed from the cloud.

2. The method of claim 1, wherein the cloud resource types are scanned in a dependency table for an interdependency analysis.

3. The method of claim 1, wherein the cloud resources comprise a set of virtual machines and a set of storage devices.

4. The method of claim 3, wherein the cloud resources further comprise at least one network.

5. The method of claim 1, wherein the set of edges comprises a first edge type and a second edge type, the first edge type being based on membership in a particular network, and the second edge type being based on use of a particular storage device.

6. The method of claim 1, wherein different types of the cloud resources are associated with different levels of precedence.

7. The method of claim 6, further comprising constructing a dependency table from which the interdependencies are determined.

8. The method of claim 7, wherein the dependency table includes a first column, a second column, and a third column, the first column corresponding to sources from among the cloud resources, the second column corresponding to targets from among the cloud resources, and the third column corresponding to dependencies between the sources and the targets, wherein the sources have at least one dependency, and the targets satisfy the at least one dependency.

9. The method of claim 1, wherein at least one of the cleanup rules is based on node association with a particular one of the nodes, such that the cloud resources, corresponding to any of the nodes that are associated with the particular one of the nodes, are removed from the cloud.

10. The method of claim 1, wherein at least one of the cleanup rules is based on an existence of an association between a particular node with respect to other ones of the nodes, such that the cloud resources corresponding to the other ones of the nodes are removed from the cloud responsive to the existence.

11. The method of claim 10, wherein the at least one of the cleanup rules is further based on a level of the association between the particular node with respect to the other ones of the nodes, such that the cloud resources corresponding to the other ones of the nodes are removed from the cloud responsive to the existence and the level of the association.

12. The method of claim 10, wherein the at least one of the cleanup rules is further based on a time limit on the association between the particular node with respect to the other ones of the nodes, such that the cloud resources corresponding to the other ones of the nodes are removed from the cloud responsive to the existence and an expiration of the time limit.

13. The method of claim 1, wherein at least one of the cleanup rules is based on an existence of a dissociation between a particular node with respect to other ones of the nodes, such that the cloud resources corresponding to the other ones of the nodes are removed from the cloud responsive to the existence.

14. The method of claim 13, wherein the at least one of the cleanup rules is further based on a time limit on the dissociation between the particular node with respect to the other ones of the nodes, such that the cloud resources corresponding to the other ones of the nodes are removed from the cloud responsive to the existence and an expiration of the time limit.

15. A computer program product for cloud resource management, the computer program product comprising a computer readable storage medium having program instructions embodied therewith, the program instructions executable by a computer to cause the computer to perform a method comprising:
constructing a dependency graph of cloud resources based on interdependencies between the cloud resources, the dependency graph including a set of nodes, a set of edges, and a precedence order, each of the nodes corresponding to one of the cloud resources, each of the edges corresponding to an association between two of the cloud resources, and the precedence order corresponding to a processing order of the nodes;
applying a set of cleanup rules to each of the nodes to determine a cleanup eligibility of any of the cloud resources corresponding to the each of the nodes; and
removing from the cloud any of the cloud resources determined to be cleanup eligible based on said applying step,
wherein the dependency graph is constructed by scanning, in a cloud resource dependency construct, different cloud resource types to be incorporated into the dependency graph, and
wherein at least one of the cleanup rules is based on node dissociation, such that the cloud resources, corresponding to any of the nodes that are dissociated with any other ones of the nodes, are removed from the cloud.

16. The computer program product of claim 15, wherein at least one of the cleanup rules is based on an existence of an association between a particular node with respect to other ones of the nodes, such that the cloud resources corresponding to the other ones of the nodes are removed from the cloud responsive to the existence.

17. The computer program product of claim 16, wherein the at least one of the cleanup rules is further based on a level of the association between the particular node with respect to the other ones of the nodes, such that the cloud resources corresponding to the other ones of the nodes are removed from the cloud responsive to the existence and the level of the association.

18. The computer program product of claim 16, wherein the at least one of the cleanup rules is further based on a time limit on the association between the particular node with respect to the other ones of the nodes, such that the cloud resources corresponding to the other ones of the nodes are removed from the cloud responsive to the existence and an expiration of the time limit.

19. A system, comprising:
a computing device, having a processor and a memory, the computing device being configured to:
construct a dependency graph of cloud resources based on interdependencies between the cloud resources, the dependency graph including a set of nodes, a set of edges, and a precedence order, each of the nodes corresponding to one of the cloud resources, each of the edges corresponding to an association between two of the cloud resources, and the precedence order corresponding to a processing order of the nodes;
apply a set of cleanup rules to each of the nodes to determine a cleanup eligibility of any of the cloud resources corresponding to the each of the nodes; and
remove from the cloud any of the cloud resources determined to be cleanup eligible based on an application of the cleanup rules to the nodes,
wherein the dependency graph is constructed by scanning, in a cloud resource dependency construct, different cloud resource types to be incorporated into the dependency graph, and wherein at least one of the cleanup rules is based on node dissociation, such that the cloud resources, corresponding to any of the nodes that are dissociated with any other ones of the nodes, are removed from the cloud.

\* \* \* \* \*